(12) United States Patent
Kobayashi et al.

(10) Patent No.: US 8,474,857 B2
(45) Date of Patent: Jul. 2, 2013

(54) AIRBAG DEVICE FOR SADDLE-RIDE TYPE VEHICLE

(75) Inventors: Yuki Kobayashi, Wako (JP); Futoshi Miyakawa, Wako (JP); Takumi Makabe, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 110 days.

(21) Appl. No.: 12/881,247

(22) Filed: Sep. 14, 2010

(65) Prior Publication Data

US 2011/0074139 A1    Mar. 31, 2011

(30) Foreign Application Priority Data

Sep. 30, 2009   (JP) ................................. 2009-228942

(51) Int. Cl.
*B60R 21/16* (2006.01)

(52) U.S. Cl.
USPC ....................................... 280/728.2; 280/735

(58) Field of Classification Search
USPC . 280/728.1, 728.2, 730.1, 734, 735; 180/218, 180/219, 271, 282
See application file for complete search history.

(56) References Cited

U.S. PATENT DOCUMENTS

| | | | |
|---|---|---|---|
| 6,615,122 B1* | 9/2003 | Yamashita | 701/45 |
| 7,324,900 B2* | 1/2008 | Knueppel et al. | 702/45 |
| 7,658,256 B2* | 2/2010 | Kobayashi | 180/274 |
| 7,997,613 B2* | 8/2011 | Kobayashi et al. | 280/735 |
| 2005/0067816 A1* | 3/2005 | Buckman | 280/730.1 |
| 2007/0051551 A1* | 3/2007 | Kobayashi | 180/274 |
| 2008/0053730 A1* | 3/2008 | Arai | 180/219 |
| 2008/0238056 A1* | 10/2008 | Kobayashi et al. | 280/735 |

FOREIGN PATENT DOCUMENTS

| | | |
|---|---|---|
| JP | 2007-069699 | 3/2007 |
| JP | 4052531 | 12/2007 |

* cited by examiner

*Primary Examiner* — Drew Brown
*Assistant Examiner* — Barry Gooden, Jr.
(74) *Attorney, Agent, or Firm* — Squire Sanders (US) LLP (57) ABSTRACT

An airbag device for a saddle-ride type vehicle can include an acceleration sensor for detecting impacts working on a body to actuate the airbag, a left-right pair of acceleration sensors in side frame members.

21 Claims, 6 Drawing Sheets

AIRBAG DEVICE FOR SADDLE-RIDE TYPE VEHICLE

BACKGROUND

1. Field

The present invention relates to improvement of airbag devices for saddle-ride type vehicles.

2. Description of the Related Art

Known airbag devices for saddle-ride type vehicles include an acceleration sensor for an airbag device for motorcycles provided near the tip of the front fork (see for instance JP Patent No. 4052531 (Japan '531) and JP-A-No. 2007-69699 (Japan '699).

According to FIG. 3 and FIG. 5 of Japan '531, a front fork to support a front wheel is disposed in the front part of the body, and a sensor for detecting acceleration in vehicle collision is provided near the tip of this front fork. In more detail, the sensor is arranged within the axle for the front wheel disposed in the front fork.

By disposing the sensor near the tip of the front fork in this way, it is made possible to detect acceleration at the time of vehicle collision immediately.

According to the known embodiment described above, an impact detecting sensor is positioned within an axle cylinder and, moreover, above the center of the body. As it is thus positioned near the steering axis line of the front fork, in frontal collision the impact transmitted from the front wheel via the axle can be sensitively detected while the steering components are removed.

Meanwhile, an airbag device requires a mechanical safetying sensor or interlock or an electronic safety system, intended to prevent the airbag from being deployed by an erroneous action of the sensor or the microcomputer that generates an airbag driving signal.

According to FIG. 3, FIG. 4 and FIG. 5 of Japan '699, left and right front forks to support a front wheel are disposed in the front part of the body, and main sensors for detecting acceleration at the time vehicle collision are provided on these front forks. Furthermore, a sub-sensor is provided integrally with the left and right front forks above the main sensor or the main sensor or behind a cross member laid between the left and right front forks.

It is intended to prevent the airbag from being erroneously deployed by any faulty operation of a single sensor by subjecting output signals of the main sensor and the sub-sensor to collision determination by an operation control section in accordance with the flow chart of FIG. 10 of Japan '699.

According to this known case, since the impact detecting main sensor is positioned on each of the left and right front forks, and their signals are averaged for use in collision determination, in frontal collision the impact transmitted from the front wheel via the axle can be sensitively detected while the steering components are removed.

Moreover, as the sub-sensor 12 is similarly positioned on the front forks 1 or the cross member 40, unless both the main sensor 11 and the sub-sensor 12 positively determine collision, no deployment signal is issued to the airbag. Thus, it is intended to prevent the airbag from being erroneously deployed even if either sensor fails to function and an ON determination is made.

According to Japan '531, as the sensor is disposed within the axle and its shape is determined by the external diameter of the axle among other factors, it becomes a dedicated component of the pertinent vehicle and is expensive.

According to Japan '699, the main sensor and the sub-sensor are arranged on the front forks where the available fitting space is reduced by the fitting of a brake caliper and a front fender among others, the freedom of arrangement is restricted. Moreover, one main sensor on each of the left and right sides and one sub-sensor on each of the left and right sides or one on the cross member are required, so that at least three sensors are needed and the number of parts is large, resulting in an increase in cost.

Besides, as the sensor and a collision judging unit disposed on the body side are distant from each other, the overall length of a harness connecting these sensor and collision judging unit 16 is extended. Moreover, as there is significant bending or flexing when the handlebar is steered, an expensive harness that can withstand significant bending or flexing.

Furthermore, though the sensor fitted to the front fork, when the vehicle has collided, can immediately detect the collision of the front wheel for instance, detection of acceleration in the longitudinal direction when the front wheel has ridden over a level gap during normal running for example, and consideration should be given to preventing this detection from affecting the operation of the airbag.

SUMMARY

An object of the invention is to provide an airbag device for saddle-ride type vehicles which is improved in the freedom of arrangement and versatility of sensors, allows a reduction in the length of the harness to be connected to the sensors, does not require the harness to be particularly durable against bending, and moreover has sensors that do not erroneously detecting external disturbances that would affect the working of the airbag.

The invention according to one embodiment includes an airbag device for a saddle-ride type vehicle provided with a head pipe, frame members extending back obliquely downward from the head pipe, an airbag for protecting a rider, and detecting means that detects any impact working on a body to actuate the airbag, the frame members are provided with a left-right pair of the detecting means.

The invention according to another embodiment is characterized in that the pair of left and right detecting means is arranged between the head pipe and a rider's seating position.

The invention according to another embodiment includes a control unit configured to control the deployment of an airbag and the control unit is disposed in the vicinity of a center of the body.

The invention according to another embodiment is such that the frame members are provided with main frames extending backward from the head pipe and a pair of left and right pivot frames connected behind the main frames. The detecting means are disposed in the frame members between the head pipe and the pivot shaft of the pivot frames.

The invention according to another embodiment includes an airbag module provided with the airbag and the control unit are disposed between the head pipe and the pivot shaft.

The invention according to another embodiment includes a left-right pair of the frame members, and wherein each of the detecting means is fitted inside the frame members in a vehicle width direction.

The invention according to another embodiment includes fitting stays fitted to the frame members, and wherein the detecting means are fitted to the fitting stays from behind.

The invention according to another embodiment is such that the detecting means are symmetrically arranged left and right with respect to a body center line.

The invention according to another embodiment is such that the control unit determines, on the basis of outputs of the detecting means and vehicle speed, any collision of the vehicle by multiple determination methods matching the vehicle speed and controls the deployment of the airbag.

As the frame members of certain embodiments are provided with a left-right pair of the detecting means, the freedom of arrangement of the detecting means can be made greater than in the existing front fork provided with a brake caliper, a front fender and the like.

Also, the distance between the detecting means and a control unit for controlling the deployment of the airbag can be reduced, enabling the harness for connection between the detecting means and the control unit to be shortened.

As a result, the harness can be made less susceptible to wire disconnection and is enabled to permit wiring more easily and, furthermore, there is no need to use an expensive harness that is particularly durable against bending, making it possible to reduce the cost and enhance reliability and productivity.

Furthermore, there is no need to provide a detecting means shape and a detecting means fitting part shape dedicated to each individual vehicle type, enabling greater versatility of the detecting means to be achieved.

Also, the disposition of the detecting means in the frame members results in a comparatively smaller influence of the riding of the wheel over a level gap on the outputs of the detecting means than that where they are disposed in the front fork, making it easier to take into account the influence on the actuation of the airbag.

As the pair of left and right detecting means is arranged, in other embodiments between the head pipe and the rider's seating position, it is possible to arrange the detecting means in the vicinity of the center of gravity of the body to detect the deceleration behavior in the longitudinal direction of the body directly and more accurately.

Therefore, it is possible to ensure a high level of accuracy that the airbag is deployed without fail when the deployment is required and is prevented from deployment without fail when the airbag deployment is unnecessary.

According to other embodiments, as the airbag device is provided with a control unit for controlling the deployment of the airbag and this control unit is disposed in the vicinity of the center of the body, arrangement of the detecting means and the control unit close to each other in the vicinity of the center of the gravity of the body enables the distance between the control unit and the detecting means to be reduced, thereby enabling the harness for connection between the control unit and the control unit to be shortened. Also, it is made easier to fix the harness between the control unit and the detecting means, so the hardness does not need to withstand significant flexing or bending.

As the frame members are provided with the main frames extending backward from the head pipe and the pair of left and right pivot frames connected behind the main frames, and the detecting means are disposed in the frame members between the head pipe and the pivot shaft of the pivot frames, the detecting means can be arranged in highly rigid frame members, enabling the deceleration behavior of the body to be detected accurately.

As an airbag module provided with the airbag and the control unit are disposed between the head pipe and the pivot shaft, it is made possible to arrange the airbag module and the control unit inside the frame members and thereby to protect the airbag module and the control unit.

According to other embodiments, as a left-right pair of the frame members is provided and each of the detecting means is fitted inside the frame members in the vehicle width direction, it is made possible to protect the detecting means with the frame members from outside in the vehicle width direction, making any separate protective means for the detecting means unnecessary.

Regarding other embodiments, fitting stays are fitted to the frame members and the detecting means are fitted to these fitting stays from behind, fastening members for fitting the detecting means to the fitting stays can be made difficult to loosen. Also, as the fitting stays are arranged ahead of the detecting means, protection can be provided by the fitting stays from spattered stones or the like from ahead. Furthermore, as the detecting means are symmetrically arranged left and right with respect to the body center line, a value averaging the acceleration outputs of the left and right detecting means constitutes the acceleration of the central part of the body, any impact in the longitudinal direction of the body can be detected accurately.

In other embodiments, as the control unit determines, on the basis of the outputs of the detecting means and the vehicle speed, any collision of the vehicle by multiple determination methods matching this vehicle speed and controls the deployment of the airbag, the most suitable determination method finely tuned to the vehicle speed can be set, enabling collision determination of the vehicle to be accomplished quickly.

Therefore, the airbag can be as promptly deployed at a timing comparable to what is achieved when the detecting means are arranged on the front fork arranged in the vicinity of the front wheel shaft, thereby making it possible to maximize occupant protecting performance.

DETAILED DESCRIPTION

An embodiment of the present invention will be described below with reference to the accompanying drawings. the left, right, front and rear directions in the description are as viewed from the perspective of a rider of the vehicle. Further, the drawings are intended to be viewed in the directions of the reference signs.

An embodiment of the present invention will be described. The arrows (FRONT) in drawings point ahead of the vehicle.

Figure 1:
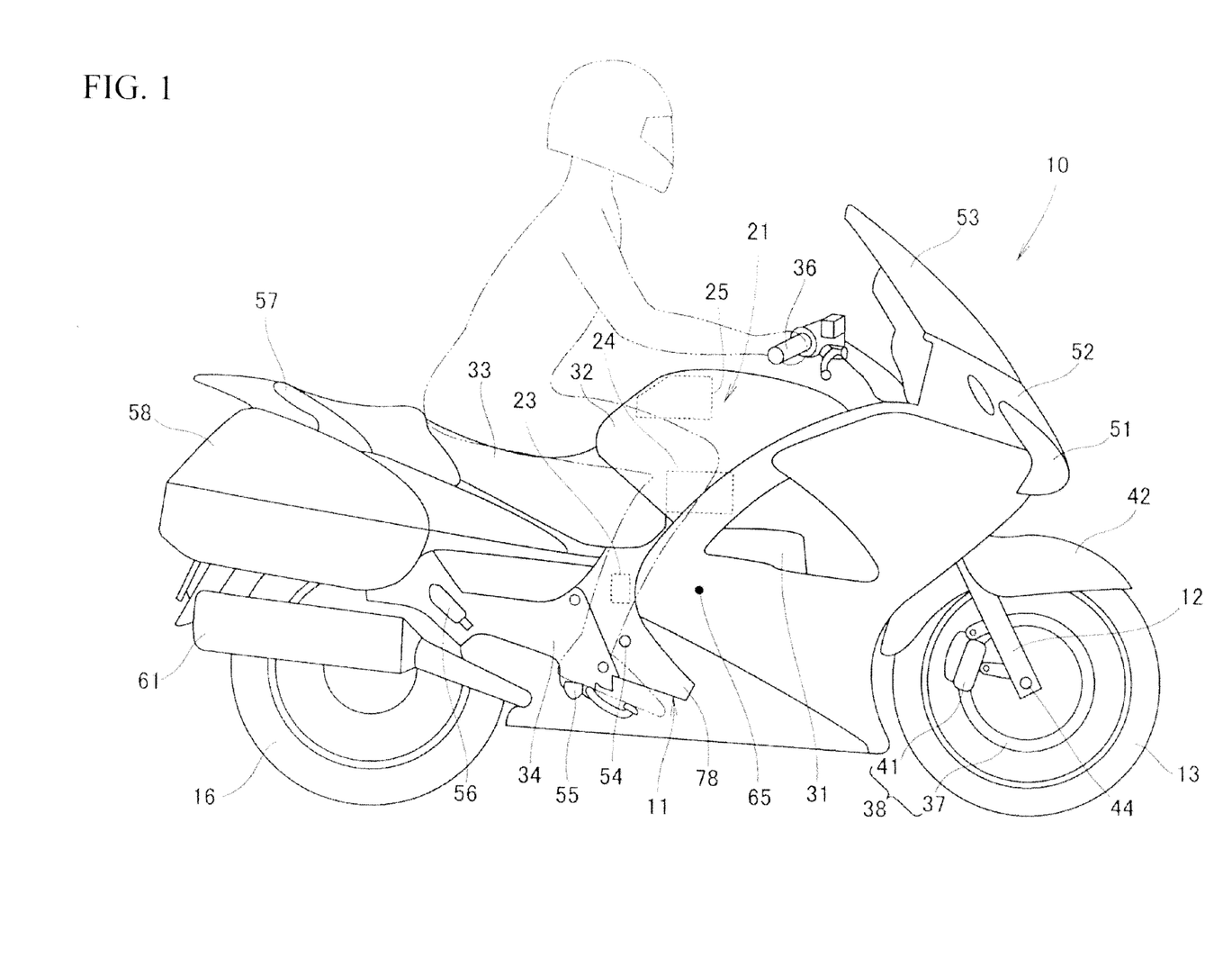
FIG. 1 is a profile of a saddle-ride type vehicle equipped with an airbag device according to the present invention.

As shown in FIG. 1, a motorcycle 10 is an example of a saddle-ride type vehicle having a front wheel 13 fitted to the front part of a body frame 11 via a front fork 12 and a rear wheel 16 fitted to the rear lower part of the body frame 11 via a swing arm (not shown) and mounted with an airbag device 21 in the central part of the body.

The body frame 11 has an engine 31, or other suitable power source, fitted to the front lower part and a fuel tank 32 fitted to the front upper part, and a seat 33 fitted to the rear upper part and a step bracket 34 fitted to the rear lower part.

The front fork 12 has a handlebar 36 fitted to the upper end, the front wheel 13 fitted to the lower end, a brake caliper 41 constituting a front wheel disk brake 38 together with a brake disk 37 fitted to the front wheel 13, and a front fender 42 covering the front wheel 13 from above. Incidentally, a reference sign 44 denotes the axle of the front wheel 13.

In drawing, a reference sign 51 denotes a headlamp; 52, a front cowl; 53, a wind screen; 54, a pivot shaft fitted to the body frame 11 to support the swing arm; 55, a rider's step; 56, a pillion passenger's step; 57, a grab rail; 58, a rear side storage box; and 61, a muffler.

The airbag device 21 includes a pair of left and right acceleration sensors 22 and 23 (only the reference sign 23 toward the viewer is shown) for detecting the acceleration of the body, an ECU (Electronic Control Unit) 24 to which detection signals from these acceleration sensors 22 and 23 are inputted. An airbag module 25 provided with an airbag which is deployed in accordance with an output signal from the ECU 24.

The acceleration sensors 22 and 23 are fitted to a pair of left and right pivot frames 77 and 78 (only the reference sign 78 toward the viewer is shown) constituting the body frame 11.

The ECU 24 can be fitted to the body frame 11 and is arranged in the vicinity of the center of gravity 65 of the motorcycle 10, namely the center of gravity 65 of the body.

The airbag module 25 includes the folded and stored airbag and an inflator that generates gas for deploying the airbag, and is arranged in a space disposed above the fuel tank 32.

Figure 2:
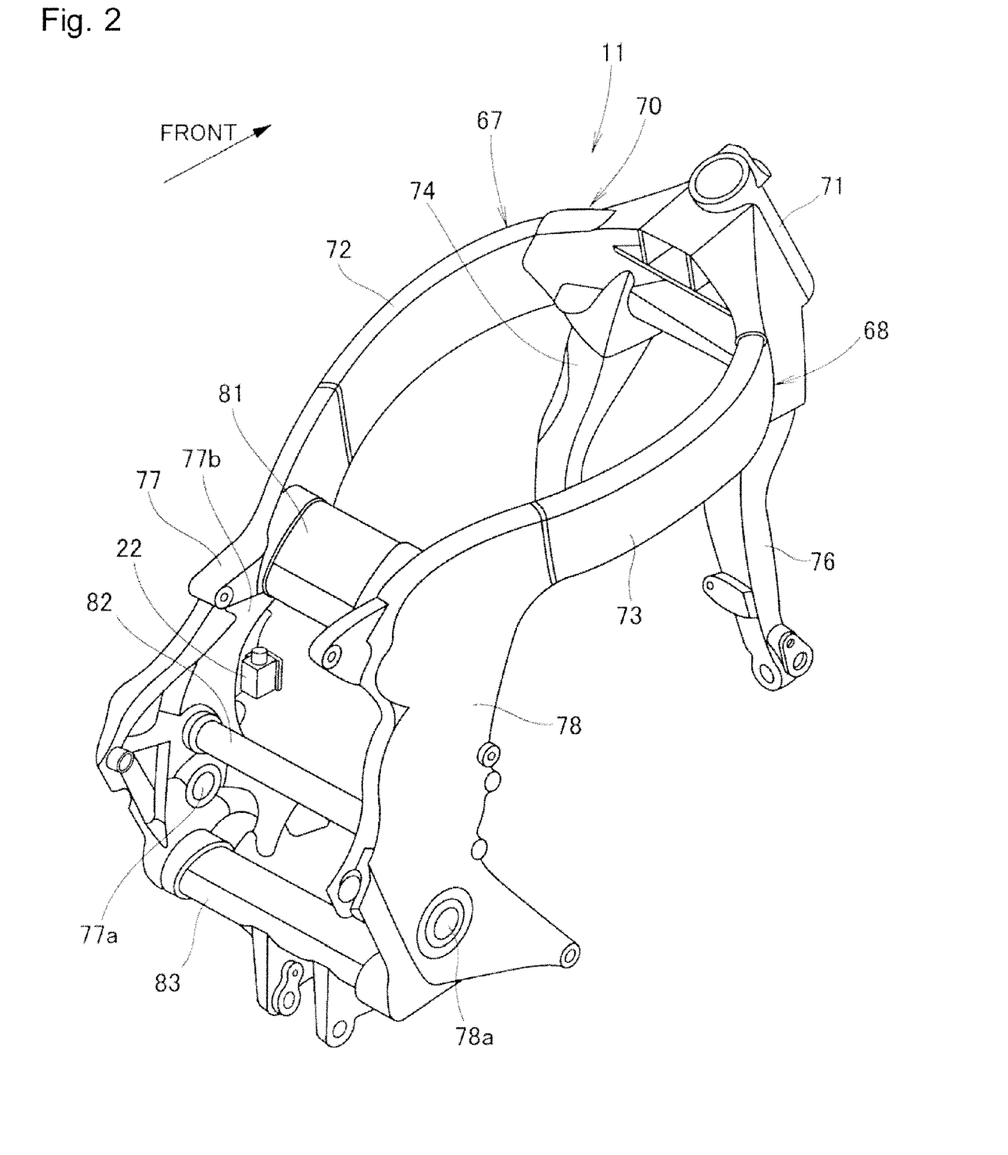
FIG. 2 is a perspective view showing a body frame of the saddle-ride type vehicle according to the present invention.

As shown in FIG. 2, a main frame part 70 constituting the body frame 11 can include a head pipe 71 steerably supporting the front fork 12 (see FIG. 1). A pair of left and right main frames 72 and 73 extend back obliquely downward from the head pipe 71, a pair of left and right down frames 74 and 76 extending down from the lower parts of the front ends of these main frames 72 and 73, and a pair of left and right pivot frames 77 and 78 extending back and down from the rear ends of the main frames 72 and 73. Cross members 81 through 83 link these pivot frames 77 and 78. Reference signs 77a and 78a denote pivot shaft fitting holes provided in the pivot frames 77 and 78, respectively, to have the pivot shaft 54 (see FIG. 1) fitted.

The left main frame 72 and pivot frame 77 are members constituting a side frame member 67, the right main frame 73 and pivot frame 78, constituting a side frame member 68. The side frame members 67 and 68 extend continuously from the head pipe 71.

The acceleration sensors 22 and 23 (only one reference sign 22 is shown) are fitted to inner faces 77b and 78b (only one reference sign 77b is shown) of the left and right pivot frames 77 and 78, respectively.

Figure 3:
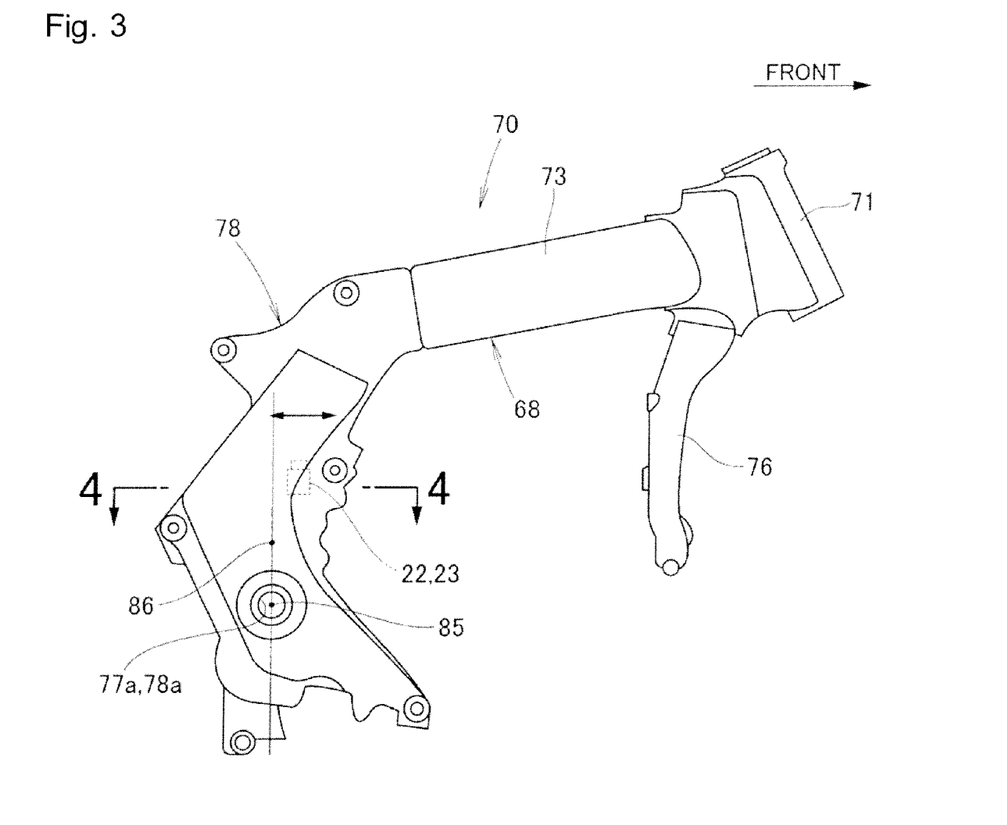
FIG. 3 is a profile showing the body frame of the saddle-ride type vehicle according to the present invention.

As shown in FIG. 3, the acceleration sensors 22 and 23, where the axis extending above the pivot shaft fitting holes 77a and 78a in the vehicle width direction past the respective centers of the pivot shaft fitting holes 77a and 78a is referred to as an axis 85 (represented here by a black round dot), are arranged ahead of a straight line 86 extending in upward and downward directions past the axis 85. Further, the acceleration sensors 22 and 23, which can function as detecting means for detecting accelerations in the directions represented by arrows in he drawing, namely in the longitudinal directions of the body, detect the level of impact resulting from collision of the motorcycle 10 against some other vehicle or the like.

By limiting the directions of acceleration detected by the acceleration sensors 22 and 23 to the longitudinal directions of the vehicle, they are made less susceptible to the effects of toppling of the vehicle (in the transverse directions of the body) or the oscillation of the body by the ruggedness or roughness of the road surface (the perpendicular directions of the body).

Figure 4:
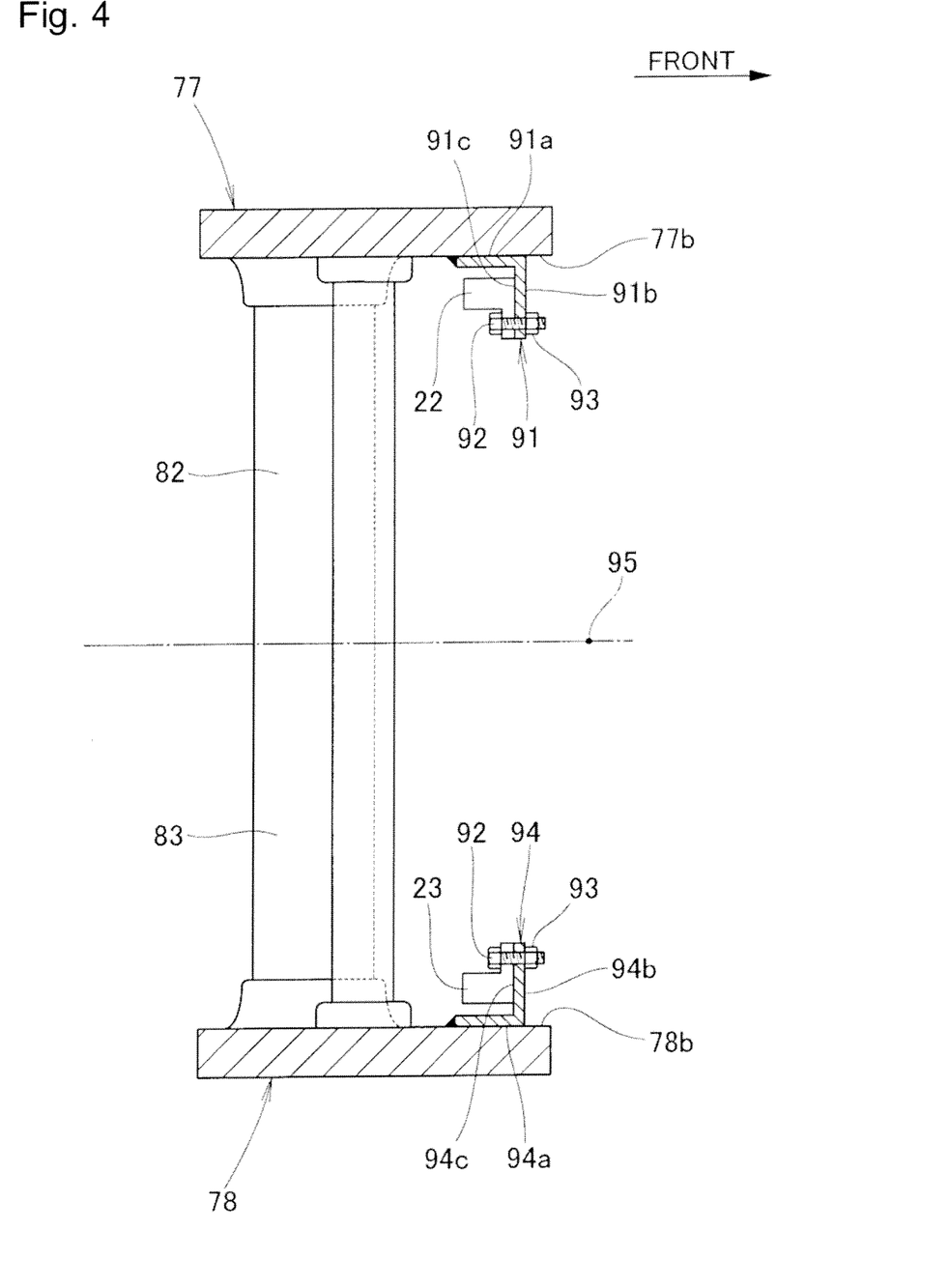
FIG. 4 is a sectional view along line 4-4 in FIG. 3.

As shown in FIG. 4, a fitting stay 91 having an L sectional shape is fitted by welding to an inner face 77b of the left pivot frame 77, and the acceleration sensor 22 is fitted to the fitting stay 91 with a bolt 92 and a nut 93.

The fitting stay 91 includes a fitting part 91a fitted to the inner face 77b of the pivot frame 77, and an inward extending part 91b extending integrally inward in the vehicle width direction from the front end of the fitting part 91a. The acceleration sensor 22 is fitted to the rear face 91c of the inward extending part 91b.

Similarly, a fitting stay 94 having an L sectional shape is fitted by welding to an inner face 78b of the right pivot frame 78, and the acceleration sensor 23 is fitted to the fitting stay 94 with the bolt 92 and the nut 93.

The fitting stay 94 includes a fitting part 94a fitted to the inner face 78b of the pivot frame 78 and an inward extending part 94b extending integrally inward in the vehicle width direction from the front end of the fitting part 94a. The acceleration sensor 23 is fitted to the rear face 94c of the inward extending part 94b.

The left and right acceleration sensors 22 and 23 can be arranged symmetrically with respect to a body center line 95 extending longitudinally past the center, in the transverse direction of the body of the motorcycle 10 (see FIG. 1). This enables accelerations on the body center line 95 to be calculated by averaging the outputs of the acceleration sensors 22 and 23.

Further, separate fitting of the acceleration sensors 22 and 23 to the rear faces 91c and 94c of the fitting stays 91 and 94, respectively, as stated above, enables external forces in the longitudinal direction working on the acceleration sensors 22 and 23 when the vehicle decelerates the running speed to be supported by the fitting stays 91 and 94, and no external force works in the axial directions of the bolts 92 and the nuts 93, enabling the bolts 92 and the nuts 93 to be prevented from loosening.

Figure 5:
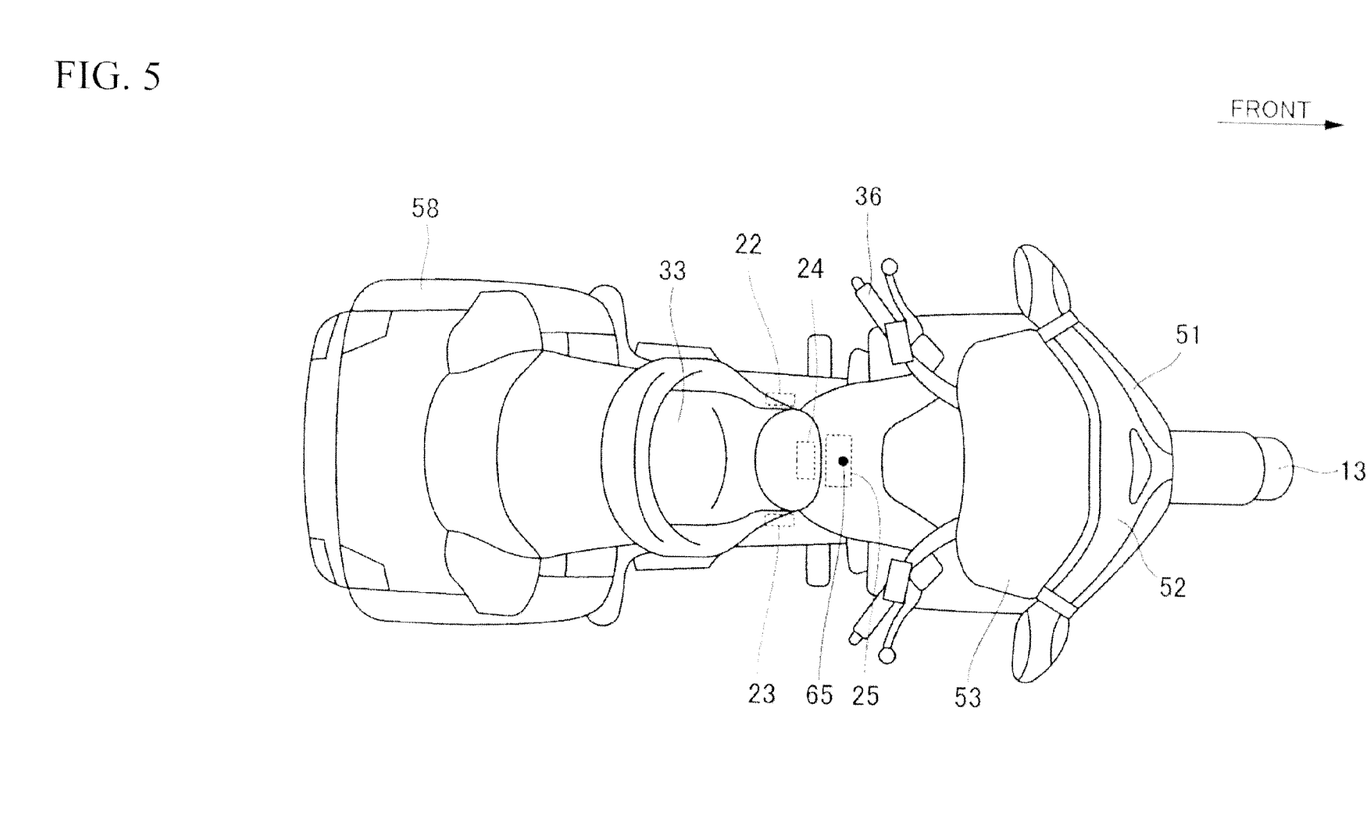
FIG. 5 is a plan of the saddle-ride type vehicle according to the present invention.

Since both the acceleration sensors 22 and 23 and the ECU 24 are arranged in the vicinity of the center of gravity 65 of the vehicle as shown in FIG. 2 and FIG. 5, the distance between the acceleration sensors 22 and 23 and the ECU 24 is shortened, and the overall length of the harness connecting these acceleration sensors 22 and 23 and the ECU 24 can be shortened.

Figure 6:
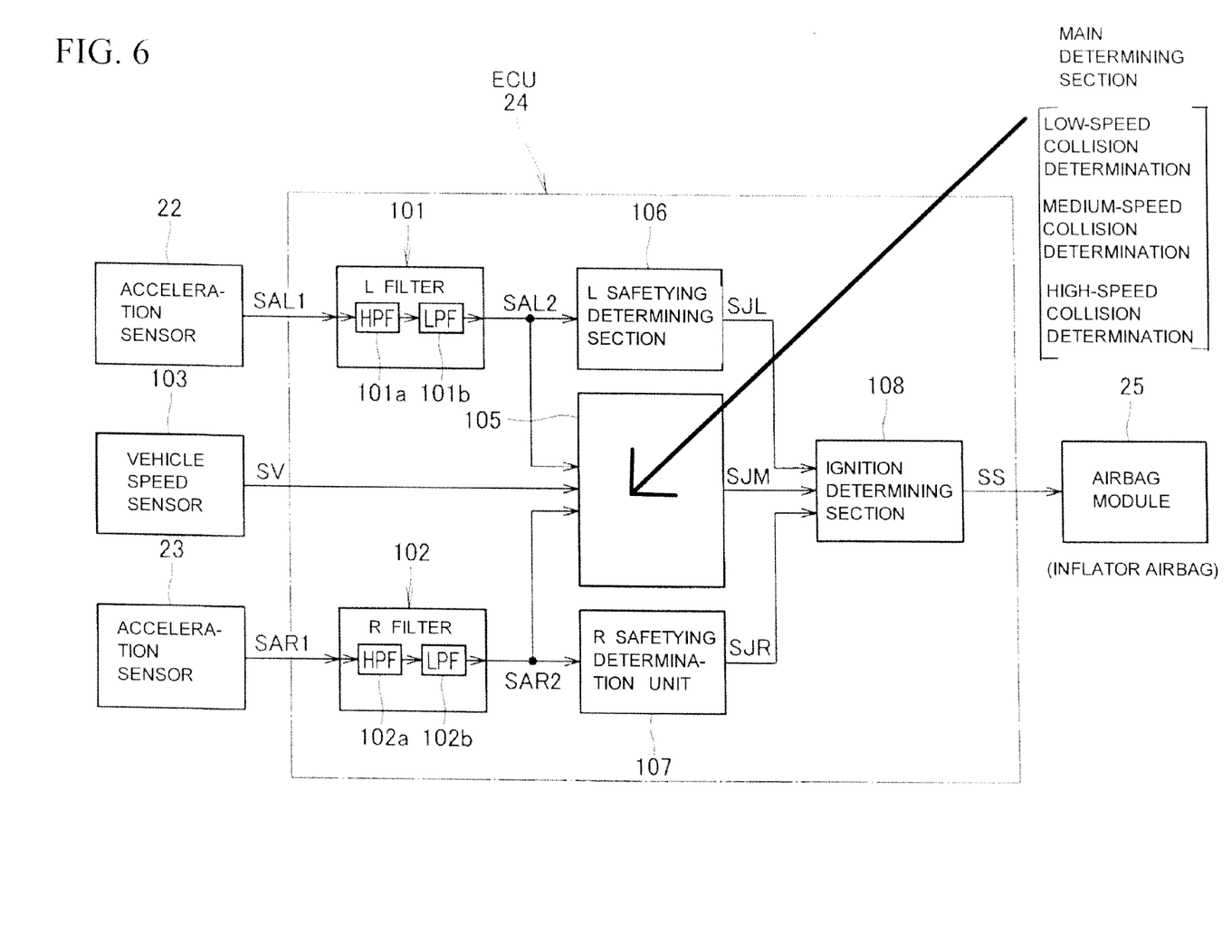
FIG. 6 is a block diagram of the airbag device according to the present invention.

As shown in FIG. 6, the ECU 24 constituting a part of the airbag device 21 (see FIG. 1) can include a digital type L filter 101 to which a left acceleration signal SAL1 from the acceleration sensor 22 is inputted, and a digital type R filter 102 to which a right acceleration signal SAR1 from the acceleration sensor 23 is inputted. A main determining section 105 can determine whether or not the vehicle has collided, on the basis of a left acceleration signal SAL2 and a right acceleration signal SAR2 having passed these L filter 101 and R filter 102, respectively, and a vehicle speed signal SV from a vehicle speed sensor 103. An L safety determining section 106 and an R safety determining section 107 are included, each of which independently determines whether or not the vehicle has collided on the basis of the left acceleration signal SAL2 having passed the L filter 101 and the right acceleration signal SAR2 having passed the R filter 102. An ignition determining section 108 outputs an ignition signal SS to the airbag module 25 on the basis of all the determination signals SJM, SJL and SJR respectively outputted from these main determining section 105, L safety determining section 106 and R safety determining section 107 to determine whether or not to ignite an inflator in the airbag module 25.

The L filter 101 and the R filter 102 are respectively provided with high-pass filters 101a and 102a for removing drift components contained in the left acceleration signal SAL1 and the right acceleration signal SAR1 and low-pass filters

101b and 102b for removing high-frequency components of or above 100 Hz, for instance, unnecessary for determination of collision.

The vehicle speed sensor 103 is a sensor to detect the revolution speed (wheel speed) of the front wheel 13 (see FIG. 1) and/or the rear wheel 16 (see FIG. 1) of the motorcycle 10 (see FIG. 1), and the vehicle speed is figured out from this wheel speed.

The vehicle speed signal may as well be obtained from an engine control unit that controls the engine 31 instead of the vehicle speed sensor 103.

The main determining section 105 is a block that determines whether or not the vehicle has collided on the basis of the vehicle speed signal SV and the average of the left acceleration signal SAL2 and the right acceleration signal SAR2 and outputs a signal corresponding to the result of determination, and includes a low-speed collision determining section, a medium-speed collision determining section, a high-speed collision determining section, a threshold calculating section and a main OR circuit.

When any of the low-speed collision determining section, the medium-speed collision determining section and the high-speed collision determining section has determined that a collision has occurred, a determination signal SJM is outputted from the main OR circuit.

The low-speed collision determining section is a block that determines whether or not the vehicle has run into low-speed collision on the basis of the average of the left acceleration signal SAL2 and the right acceleration signal SAR2. It cumulatively integrates all the time the averages of the left acceleration signal SAL2 and the right acceleration signal SAR2 and determines that collision has occurred if the integrated value surpasses a threshold.

As the low-speed collision determining section constantly cumulatively integrates acceleration signals, acceleration signals for other factors than collision, such as sudden acceleration or sudden deceleration, are also accumulated.

To eliminate this inconvenience, after subtracting such accelerations as would be detected at the time of sudden acceleration or sudden deceleration, not collision, from acceleration signals, and the balances are cumulatively integrated.

Since it is possible to grasp a collision event for a long period (i.e. the whole collision event) by low-speed collision determination, this is suitable for making distinction between, for instance, light collision against another vehicle whose rigidity is high (a short-period collision for which the detected acceleration forbidding deployment of the airbag is high) and low-speed collision against another vehicle whose rigidity is low (a long-period collision for which the detected acceleration necessitating deployment of the airbag is low).

The medium-speed collision determining section is a block that determines whether or not the vehicle has run into medium-speed collision on the basis of the average between the left acceleration signal SAL2 and the right acceleration signal SAR2.

It integrates the left acceleration signals SAL2 and the right acceleration signals SAR2 always in a constant time range, and determines that collision has occurred if the integrated value surpasses a threshold.

The time range of integration being represented by $\Delta t$, the integral to be used at a certain point of time T is the result of integration of acceleration signals from $T-\Delta t$ until T.

Although medium-speed collision determination is more difficult to grasp the whole collision event than low-speed collision determination, it is easier to grasp the collision event than high-speed collision determination to be described next, and allows collision determination in a shorter period of time than low-speed collision determination.

The high-speed collision determining section is a block that determines whether or not the vehicle has run into high-speed collision on the basis of the average between the left acceleration signal SAL2 and the right acceleration signal SAR2.

It averages in a constant time range the averages of the left acceleration signals SAL2 and the right acceleration signals SAR2, and further determines that collision has occurred if a variation of this average in a certain length of time surpasses a threshold.

Since high-speed collision determination is made on the basis of the variation of acceleration, it is easier to grasp body acceleration which abruptly rises when, for instance, the vehicle has collided with another vehicle of high rigidity at high speed, and to make determination more sensitive to the rise of impact at an earlier timing.

The L safetying determining section 106 and the R safetying determining section 107 are a block for preventing the airbag from being operated erroneously even if either the acceleration sensor 22 or the acceleration sensor 23 works wrongly with the consequence that, even though no collision has occurred, the main determining section 105 outputs a signal informing of collision occurrence.

Each of the L safetying determining section 106 and the R safetying determining section 107 independently integrates the values of the left acceleration signal SAL2 and the right acceleration signal SAR2 always in a constant time range, and outputs the determination signal SJL or the determination signal SJR when the integral has surpassed a threshold.

The ignition determining section 108 determines whether or not the inflator of the airbag module 25 should be ignited on the basis of the determination signals SJM, SJL and SJR and, if the determination is ON, outputs the ignition signal SS to the inflator of the airbag module 25 or, if the determination is OFF, does not output the ignition signal SS.

Back to FIG. 4, disadvantages of equipping the pivot frames 77 and 78 with the acceleration sensors 22 and 23 include (A) a delay in the time of detecting any acceleration compared with the existing arrangement of acceleration sensors on the front fork in the vicinity of the front wheel shaft and (B) the acceleration sensors 22 and 23, which are positioned closer to the engine 31 (see FIG. 1), become more susceptible to the influences of engine vibration and the electrical noise such as the ignition pulse.

According to embodiments of the present invention, with a view to addressing the problems noted above, (A) cited above is addressed by implementing a determination method using multiple logics (low-speed collision determination, medium-speed collision determination and high-speed collision determination) by the main determining section 105 (see FIG. 6) for collision determination, which makes possible collision determination finely in response to the vehicle speed, enabling the airbag to be as promptly deployed at a timing comparable to what is achieved when the acceleration sensors are arranged on the front fork in the vicinity of the front wheel shaft and thereby to secure rider protecting performance.

Also regarding (B) cited above, by equipping the airbag device 21 with the L filter 101 and the R filter 102 both of a digital type, it is made possible to remove high-frequency components including engine vibration and electrical noise with a low-pass filter and to remove low-frequency components including low acceleration signals and drift at the time of the vehicle's acceleration or deceleration with a high-pass filter, enabling the accuracy of collision determination to be enhanced and the threshold of collision determination to be lowered.

Further advantageous effects of the present invention resulting from the pivot frames 77 and 78 with the pair of acceleration sensors 22 and 23 include the following.

The space is made greater than in the existing front fork provided with a brake caliper, a front fender and the like, enabling the freedom of arrangement of the acceleration sensors 22 and 23 to be dramatically increased.

By averaging the outputs of the acceleration sensors 22 and 23 resulting from the pairing of the left and right acceleration sensors 22 and 23, the acceleration is enabled to be figured out in the central part of the body in the widthwise direction, where the acceleration would be otherwise difficult to measure and acceleration data in the vicinity of the center of gravity of the body are thereby made available.

In the event of the failure of one acceleration sensor (or acceleration sensor 23) to function normally, the other acceleration sensor 23 (or acceleration sensor 22) can detect acceleration to enable collision determination to be made, enabling the airbag device 21 (see FIG. 1) to be made more reliable than where only one acceleration sensor is provided.

The distance between the ECU 24 of the airbag arranged in the central part of the body and the acceleration sensors 22 and 23 can be reduced, enabling the harness for connection between the ECU 24 and the acceleration sensors 22 and 23 to be shortened.

There is no need to provide an acceleration sensor shape and an acceleration sensor fitting part shape dedicated to each individual vehicle type, enabling greater versatility to be achieved.

In contrast to the disposition of equipping the front fork with acceleration sensors, unnecessary acceleration detection, such as what would occur when the front wheel 13 (see FIG. 1) has ridden over a level gap, can be eliminated.

The acceleration sensors 22 and 23 can be protected with the pivot frames 77 and 78, other frame members linked to the pivot frames 77 and 78, and parts fitted to the pivot frames 77 and 78.

As shown in FIG. 1, FIG. 2 and FIG. 4 above, the airbag device 21 for the motorcycle 10 as a saddle-ride type vehicle provided with the head pipe 71 supporting the handlebar 36 turnably, the side frame members 67 and 68 as frame members extending back obliquely downward from the head pipe 71, the airbag device 21 protecting the rider, and the acceleration sensors 22 and 23 as detecting means for detecting impacts working on the body to actuate the airbag device 21 is characterized in that the left-right pair of acceleration sensors 22 and 23 is provided in the side frame members 67 and 68 (in more detail the pivot frames 77 and 78).

By the configuration described above, as the side frame members 67 and 68 are provided with the pair of left and right acceleration sensors 22 and 23, the freedom of arrangement of the acceleration sensors 22 and 23 can be made greater than in the existing front fork provided with a brake caliper, a front fender and the like.

Also, the distance between the acceleration sensors 22 and 23 and the ECU 24 as the control unit for controlling the deployment of the airbag can be reduced, enabling the harness for connection between the acceleration sensors 22 and 23 and the ECU 24 to be shortened.

As a result, the harness can be made less susceptible to wire disconnection and is enabled to permit wiring more easily and, furthermore, there is no need to use an expensive harness that is particularly durable against bending, making it possible to reduce the cost and enhance reliability and productivity.

Moreover, there is no need to provide a dedicated shape of the acceleration sensors 22 and 23 or a dedicated fitting part shape of to each individual vehicle type, enabling the versatility of the acceleration sensors 22 and 23 to be enhanced.

Furthermore, the disposition of the acceleration sensors and 23 in the side frame members 67 and 68 results in a smaller influence of the riding of the front wheel 13 (see FIG. 1) over a level gap on the outputs of the acceleration sensors 22 and 23 than that where they are disposed in the front fork, making it easier to take into account the influence on the operation of the airbag.

Since the pair of left and right acceleration sensors 22 and 23 is arranged between the head pipe 71 and the rear part of the seat 33 as shown in FIG. 1, it is possible to arrange the acceleration sensors 22 and 23 in the vicinity of the center of gravity of the body to detect the deceleration behavior of the body directly and more accurately.

Therefore, it is possible to ensure a high level of accuracy that the airbag is deployed without fail when the deployment is required and is prevented from deployment without fail when the airbag deployment is unnecessary.

Since the airbag device 21 is provided with the ECU 24 for controlling the deployment of the airbag and the ECU 24 is disposed in the vicinity of the center of the body, as shown in FIG. 1 and FIG. 6, the distance between the ECU 24 and the acceleration sensors 22 and 23 can be shortened by arranging the acceleration sensors 22 and 23 and the ECU 24 in the vicinity of the center of gravity of the body, and it is made possible to make the harness to connect these ECU 24 and acceleration sensors 22 and 23 less susceptible to wire disconnection. Also, it is made easier to fix the harness between the ECU 24 and the acceleration sensors 22 and 23, making the use of a harness particularly durable against bending unnecessary.

Since the pair of left and right side frame members 67 and 68 is provided and the acceleration sensors 22 and 23 are fitted to the side frame members 67 and 68 inward in the vehicle width direction as shown in FIG. 2 and FIG. 4, the acceleration sensors 22 and 23 can be protected by the side frame members 67 and 68 from outside in the vehicle width direction, making any separate protective means for the acceleration sensors 22 and 23 unnecessary.

Since the fitting stays 91 and 94 can be fitted to the side frame members 67 and 68 and the acceleration sensors 22 and 23 are fitted to these fitting stays 91 and 94 from behind as shown in FIG. 4, fastening members (the bolts 92 and nuts 93) for fitting the acceleration sensors 22 and 23 to the fitting stays 91 and 94 can be made difficult to loosen.

Also, as the acceleration sensors 22 and 23 are symmetrically arranged left and right with respect to the body center line 95, a value averaging the acceleration outputs of the left and right acceleration sensors 22 and 23 constitutes the acceleration of the central part of the body, and any impact in the longitudinal direction of the body can be detected accurately.

Since the ECU 24, on the basis of the outputs of the acceleration sensors 22 and 23 and the vehicle speed, determines any collision of the vehicle by multiple determination methods matching the vehicle speed and controls the deployment of the airbag as shown in FIG. 6, the most suitable determination method finely can be set in response to the vehicle speed, enabling collision determination of the vehicle to be accomplished quickly.

Therefore, the airbag can be as promptly deployed at a timing comparable to what is achieved when the acceleration sensors are arranged on the front fork in the vicinity of the front wheel shaft, thereby making it possible to secure rider protecting performance.

Though the acceleration sensors 22 and 23 are disposed on the pivot frames 77 and 78 in the embodiment as shown in FIG. 4, this is not the only possible disposition. They may also be disposed on the left and right main frames 72 and 73 shown in FIG. 2.

The airbag device according to the present invention is highly suitable for saddle-ride type vehicles, but can also be implemented in other types of vehicles, while remaining within the spirit and scope of the invention.

[Reference Signs List]
10 . . . Saddle-ride type vehicle (motorcycle)
21 . . . Airbag device
22, 23 . . . Detecting means (acceleration sensor)
24 . . . Control unit (ECU)
25 . . . Airbag module
33 . . . Seat
36 . . . Handlebar
54 . . . Pivot shaft
67, 68 . . . Frame member (side frame member)
71 . . . Head pipe
72, 73 . . . Main frame
77, 78 . . . Pivot frame
91, 94 . . . Fitting stay
95 . . . Body center line
[Document Name] Drawings
FIG. 6
22, 23 ACCELERATION SENSOR
103 VEHICLE SPEED SENSOR
101 L FILTER
102 R FILTER
106 L SAFETYING DETERMINING SECTION
105 MAIN DETERMINING SECTION
   LOW-SPEED COLLISION DETERMINATION
   MEDIUM-SPEED COLLISION DETERMINATION
   HIGH-SPEED COLLISION DETERMINATION
107 R SAFETYING DETERMINATION UNIT
108 IGNITION DETERMINING SECTION
25 AIRBAG MODULE (INFLATOR AIRBAG)

We claim:

1. An airbag device for a saddle-ride vehicle, said airbag device comprising:
   an airbag configured to protect a rider; and
   a pair of detectors configured to detect any impact working on a body to actuate the airbag, wherein one detector of said pair of detectors is configured to be mounted on a left side of a vehicle frame and another detector of said pair of detectors is configured to be mounted on a right side of the vehicle frame,
   wherein frame members are provided with main frames extending backward from a head pipe and a pair of left and right pivot frames connected behind the main frames,
   wherein the left and right detectors are configured to be disposed on the frame members between the head pipe and a pivot shaft of the pivot frames, and
   wherein the left and right detectors are arranged above the pivot shaft of the pivot frames in a vertical direction.

2. The airbag device according to claim 1, wherein the left and right detectors are configured to be placed on the vehicle frame between the head pipe and a rider's seating position.

3. The airbag device according to claim 1, wherein each of the detectors is fit inside the frame members in a vehicle width direction.

4. The airbag device according to claim 1, further comprising fitting stays fit to the frame members, wherein the detectors are configured to be fit to the fitting stays from behind 5. The airbag device according to claim 1, wherein the detectors are symmetrically arranged left and right with respect to a body center line.

6. The airbag device according to claim 1, wherein the detectors are configured to detect accelerations in a longitudinal direction of the vehicle body.

7. The airbag device according to claim 1, further comprising a control unit configured to control deployment of the airbag, wherein the control unit is disposed in a vicinity of a center of the vehicle.

8. The airbag device according to claim 7, further comprising an airbag module provided with the airbag, wherein the airbag module and the control unit are configured to be disposed between the head pipe and the pivot shaft.

9. The airbag device according to claim 7, wherein the control unit is configured to determine, on a basis of outputs of the detectors and vehicle speed, any collision of the vehicle by multiple determination methods matching the vehicle speed, and is configured to control deployment of the airbag.

10. A saddle-ride vehicle, said vehicle comprising:
   a head pipe;
   left-side and right-side frame members extending backward and obliquely downward from the head pipe;
   an airbag configured to protect a rider; and
   a pair of detectors configured to detect any impact working on a body to actuate the airbag, wherein one detector of said pair of detectors is configured to be mounted on the left-side frame member and another detector of said a pair of detectors is configured to be mounted on the right-side frame member, said frame members forming a part of a vehicle frame,
   wherein said frame members are provided with main frames extending backward from the head pipe, and a pair of left and right pivot frames are connected behind the main frames,
   wherein the left and right detectors are configured to be disposed on the frame members between the head pipe and a pivot shaft of the pivot frames, and
   wherein the left and right detectors are arranged above the pivot shaft of the pivot frames in a vertical direction.

11. A saddle-ride vehicle as recited in claim 10, wherein the pair of detectors are configured to be placed on the frame members between the head pipe and a rider's seating position.

12. A saddle-ride vehicle according to claim 10, wherein each of the detectors is fit inside the frame members in a vehicle width direction.

13. A saddle-ride device according to claim 10, further comprising fitting stays attached to the frame members, wherein the detectors are configured to be fit to the fitting stays from behind 14. A saddle-ride vehicle according to claim 10, wherein the detectors are symmetrically disposed left and right with respect to a body center line.

15. A saddle-ride device according to claim 10, wherein the detectors are configured to detect accelerations in a longitudinal direction of the vehicle body.

16. A saddle-ride vehicle according to claim 10, further comprising a control unit configured to control a deployment of the airbag, wherein the control unit is disposed in a vicinity of a center of the vehicle.

17. A saddle-ride vehicle according to claim 16, further comprising an airbag module provided with the airbag, wherein the airbag module and the control unit are disposed between the head pipe and a pivot shaft.

18. A saddle-ride vehicle according to claim 16, wherein the control unit is configured to determine, based upon outputs of the detectors and vehicle speed, any collision of the vehicle by multiple determination methods matching the vehicle speed, and is configured to control deployment of the airbag.

19. An airbag device for a saddle-ride vehicle, said airbag device comprising:

airbag means for protecting a rider;

detecting means for detecting any impact working on a body to actuate the airbag means, wherein said detecting means comprises a first detector mounted on a left side of a vehicle frame and a second detector mounted on a right side of the vehicle frame, wherein frame members are provided with main frames extending backward from a head pipe, and a pair of left and right pivot frames are connected behind the main frames, wherein the left and right detectors are configured to be disposed on the frame members between the head pipe and a pivot shaft of the pivot frames, and wherein the left and right detectors are arranged above the pivot shaft of the pivot frames in a vertical direction.

20. The airbag device according to claim 19, further comprising control means for controlling deployment of the airbag means, wherein said control means is disposed in a vicinity of a center of the vehicle.

21. The airbag device according to claim 20, wherein the control means is also for determining, on a basis of outputs of the detector means and vehicle speed, any collision of the vehicle by multiple determination methods matching the vehicle speed, and for controlling the deployment of the airbag means.

* * * * *